United States Patent [19]

Hetzel

[11] 4,194,084
[45] Mar. 18, 1980

[54] APERTURE CAPACITOR PICKUP

[75] Inventor: Henry T. Hetzel, Loveland, Colo.

[73] Assignee: Hewlett-Packard Company, Palo Alto, Calif.

[21] Appl. No.: 952,230

[22] Filed: Oct. 17, 1978

[51] Int. Cl.² .............................................. G08C 21/00
[52] U.S. Cl. ....................................................... 178/19
[58] Field of Search ...................... 361/278, 292, 303; 178/18, 19; 340/146.3 SY; 33/1 M

[56] References Cited

U.S. PATENT DOCUMENTS

| 3,419,769 | 12/1968 | Elnekave et al. | 361/303 |
| 3,727,117 | 4/1973 | Robinson | 361/303 |
| 3,876,831 | 4/1975 | Wickham et al. | 178/19 |

Primary Examiner—Thomas A. Robinson
Attorney, Agent, or Firm—Edward L. Miller

[57] ABSTRACT

The location and shape of a region of capacitive coupling between two conductive surfaces is determined by a grounded shield interposed between the two surfaces. The shield has an aperture which limits and defines the region of capacitive coupling, between the two surfaces, for a signal referenced to the ground. This principle is applied to provide a transparent capacitive aperture pickup for a digitizer by laminating together pieces of glass having transparent conductive coatings.

23 Claims, 14 Drawing Figures

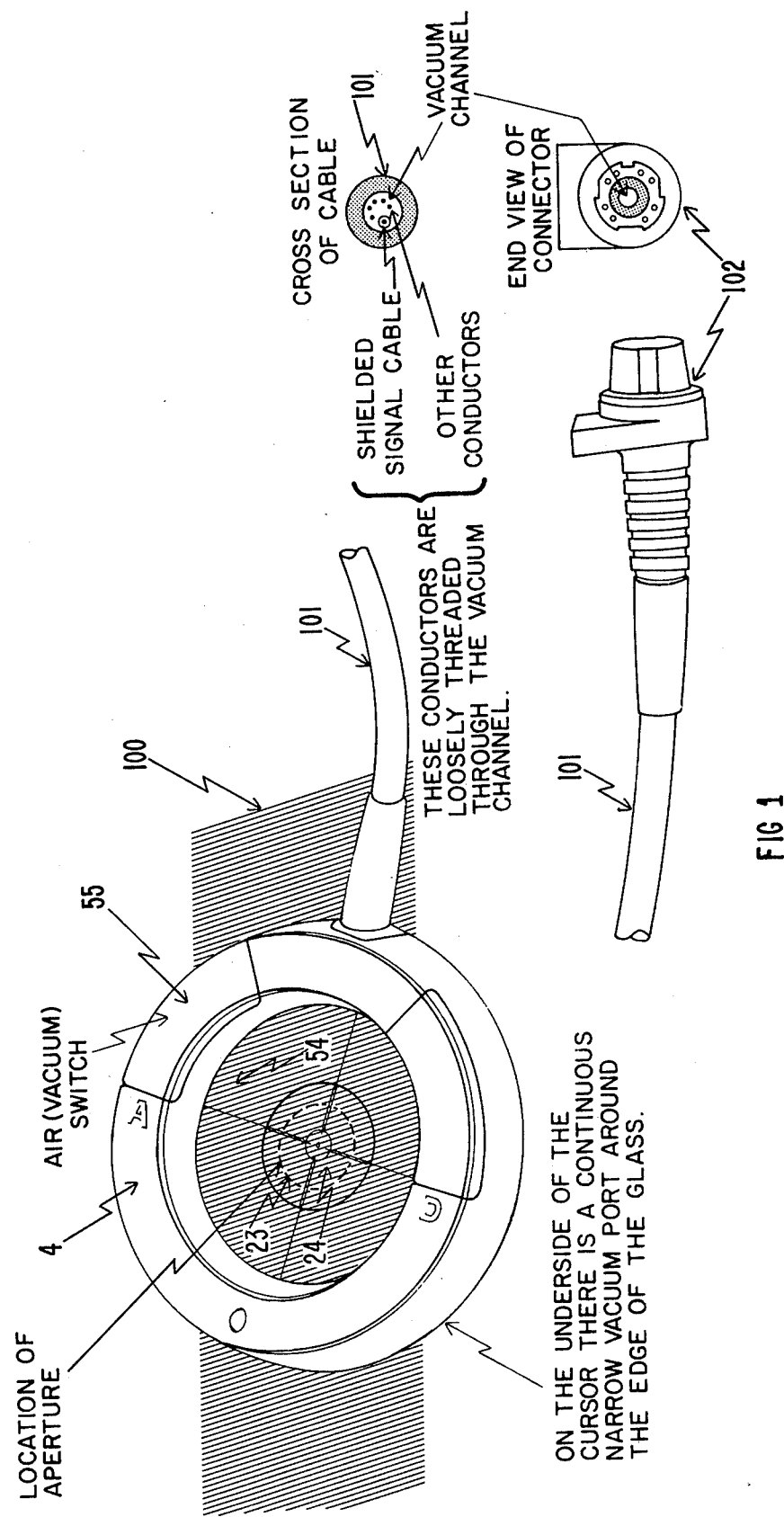

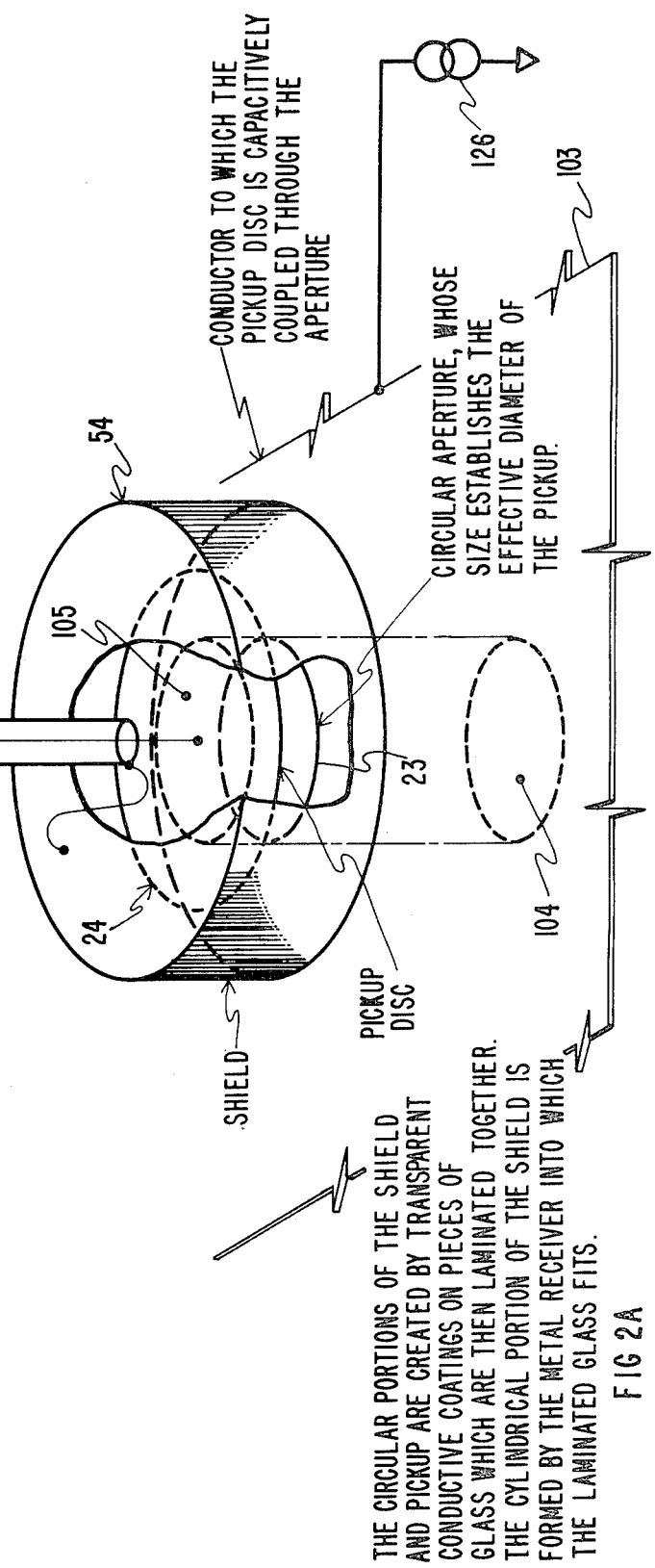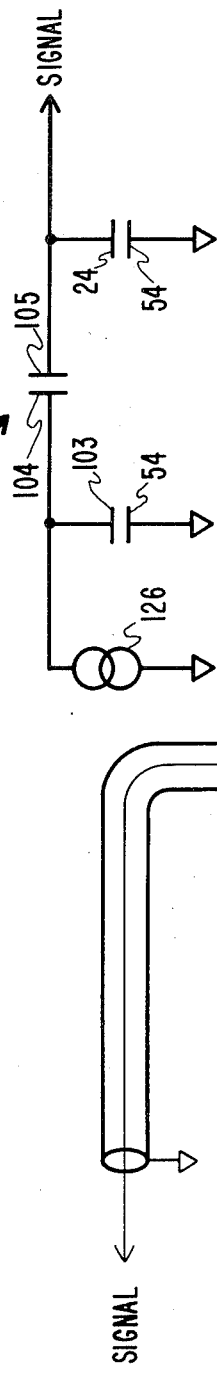

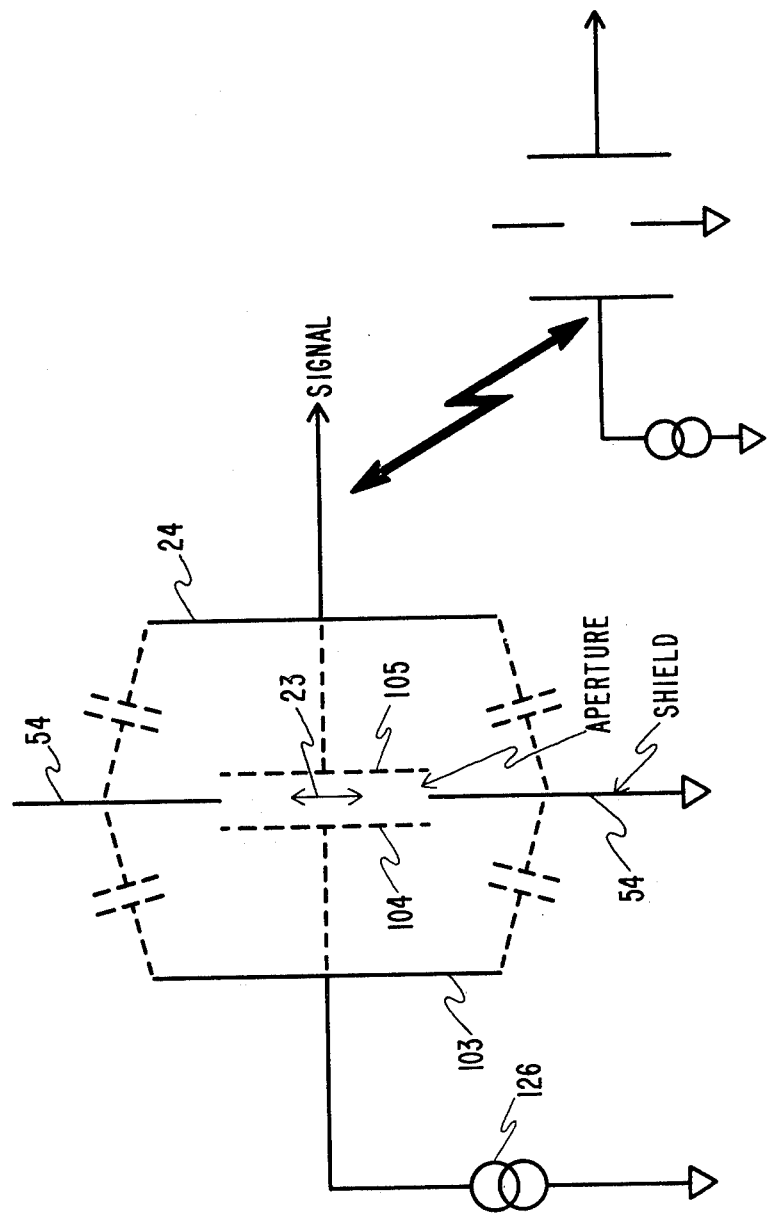

THE INTERIOR OF THE CURSOR

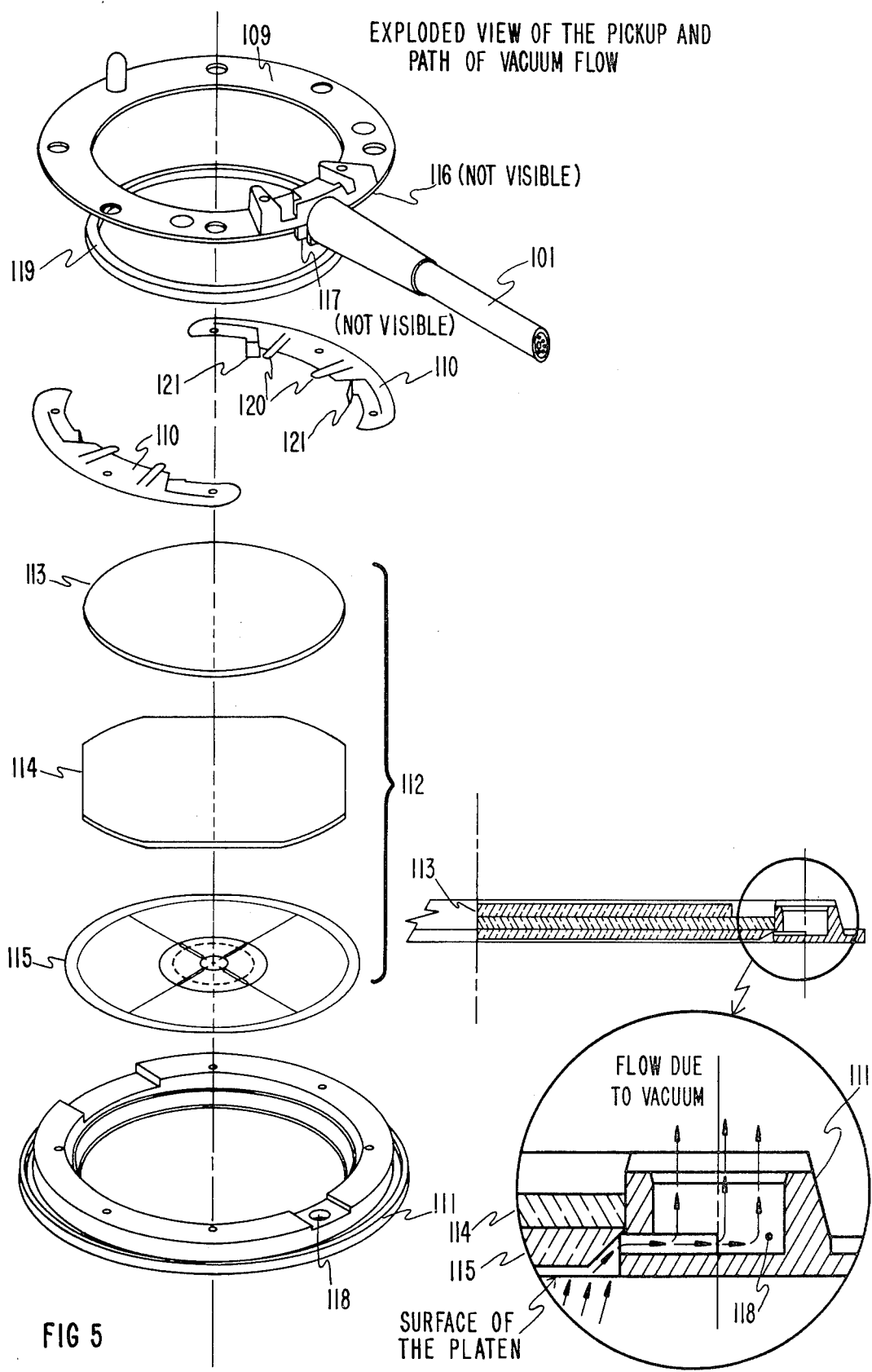

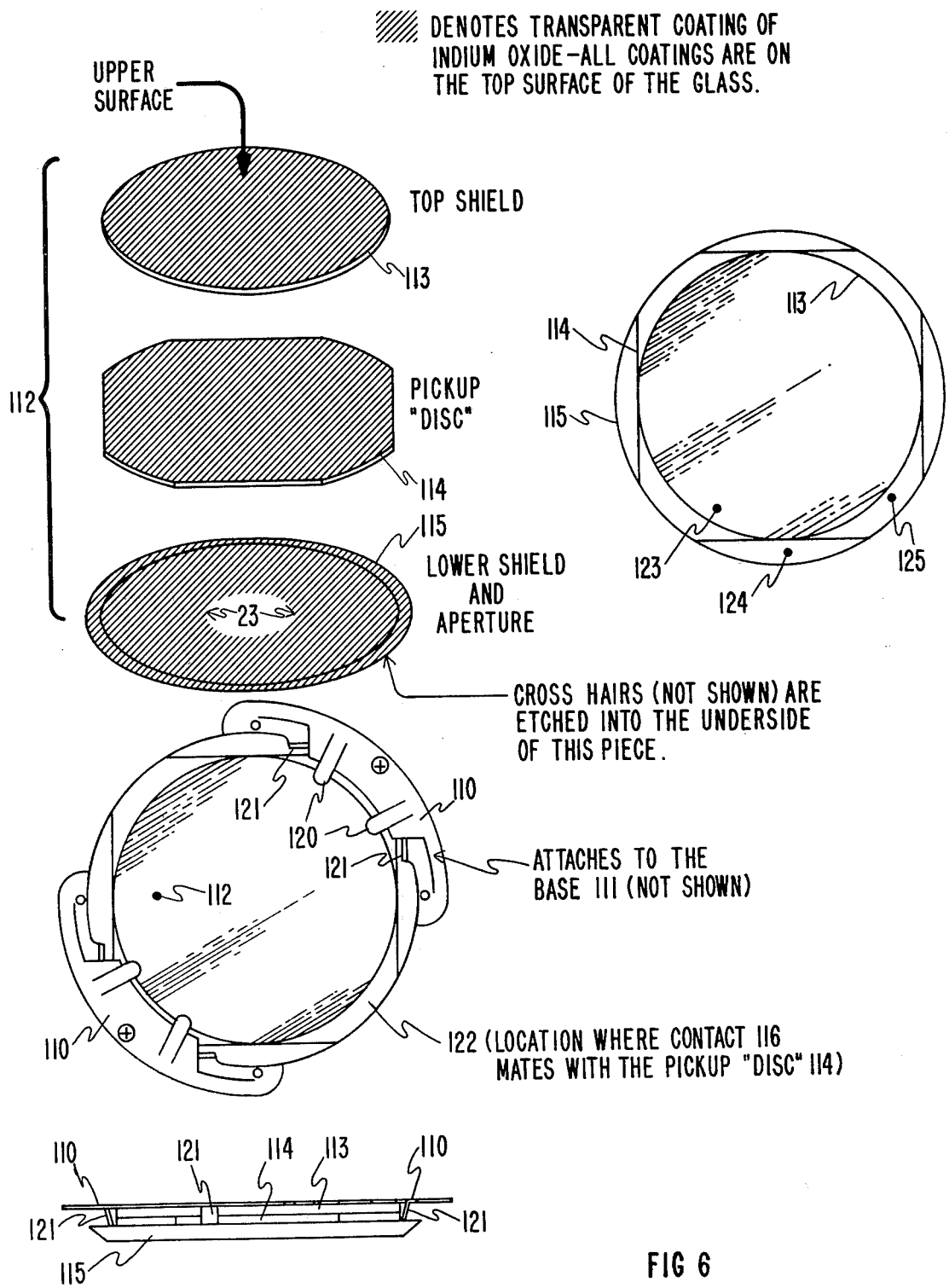

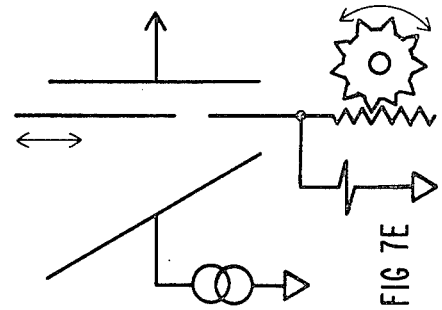
VARIABLE CAPACITIVE COUPLING USING A MOVABLE APERTURE AND NON-PARALLEL PLATES
FIG 7E
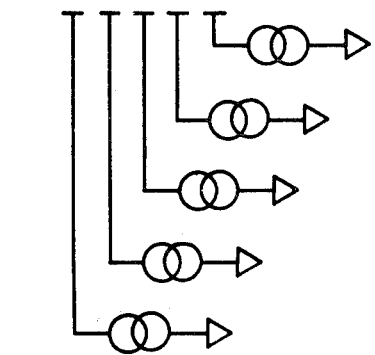
THESE ELEMENTS MOVE IN UNISON
THE BASIC CONCEPT APPLIED TO A CAPACITIVE PICKUP FOR A TRAVELING WAVE DIGITIZER
FIG 7B
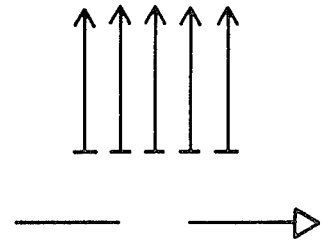
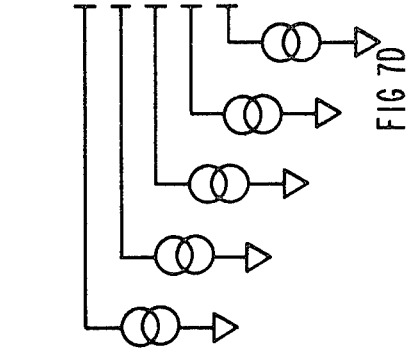
FIG 7D
THE OTHER LOGICALLY POSSIBLE CONFIGURATIONS INVOLVING MULTIPLE PLATES
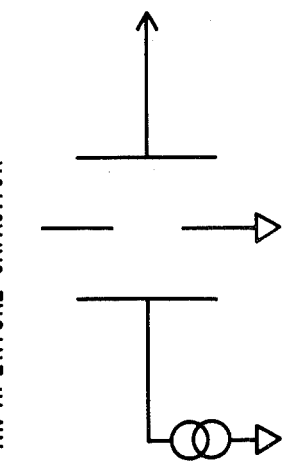
THE BASIC CONCEPT OF AN APERTURE CAPACITOR
FIG 7A
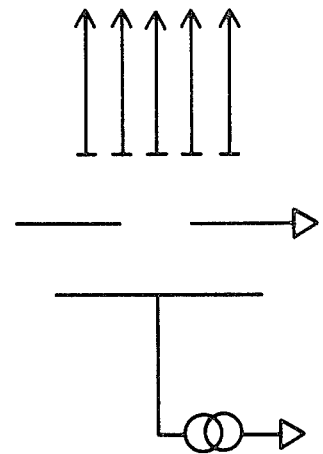
FIG 7C

4,194,084

APERTURE CAPACITOR PICKUP

REFERENCE TO RELATED APPLICATION

This application is related to a portion of the subject matter of copending U.S. patent application Ser. No. 944,931 entitled TRAVELLING WAVE DIGITIZER, filed on Sept. 22, 1978, by Frank Carau, Sr., Henry T. Hetzel, and Michael A. Tremblay and assigned to the same assignee as the present application.

BACKGROUND OF THE INVENTION

Capacitive pickups for digitizers have been in use for some time. Perhaps the simplest of these devices are the hand held stylii, which resemble, and often incorporate, ball point pens. In this class of device the essential element is a conductive region, at or near the tip, having capacitive coupling to elements in the digitizing surface, or platen. A stylus suffers from sveral drawbacks. First, it tends to be sensitive to error induced due to the operator's inadvertent tilting of the stylus. Second, it is sometimes difficult to adequately shield the stylus from the effects of stray capacitive coupling, e.g., to the hand of the operator. And last, the small tip of a stylus does not afford much coupling between the pickup and the platen, particularly in comparison to other capacitive pickup techniques. In consequence, stylii are used in applications involving low to medium accuracy where the convenience of a stylus, and possibly the utility of writing with the stylus, are important.

Increased accuracy of positioning and freedom from tilt error are obtained by use of a cursor having a reticle, or cross hairs. Such cursors have a broad flat surface that automatically prevents tilting when the cursor is placed on the platen. The cross hairs allow positioning with great accuracy, often to within a few thousandths of an inch. Transparency is a virtual requirement in this class of capacitive pickups, particularly in the immediate region of the cross hairs. However, this can give rise to some significant construction problems.

A transparent conductive disc could be used as the pickup. It would provide good coupling and would not interfere with the operator's view of the workpiece. It could be deposited on a single transparent substrate such as glass, and centered with the cross hairs. However, the conductors going to the disc should be shielded, and that implies costly multi-layer techniques.

Another solution has been to support, in the interior of the reticle, a circular metal ring whose center is coincident with the intersection of the cross hairs. Shielding and alignment are potential serious problems with this approach.

Yet another solution has been to surround the exterior of the reticle with a conductive circular ring, or with a circular pattern of symmetrically placed discs. The last two techniques also provide more coupling than a stylus does, but since the effective center of the pickup is now further from the actual region of coupling, alignment errors can be difficult to control. In addition, if a series of discs are used, rather than a continuous ring or actual disc, and if the digitizing technique is sensitive to changes in the amplitude of the sensed signal, errors may arise due to varying degrees of coupling from the discrete discs to discrete elements in the platen as the cursor is rotated about its cross hairs.

An additional disadvantage of any scheme utilizing coupling to conductors exterior to the reticle is that effective diameter of the pickup is made larger than the diameter of the viewing area. Thus, if the user positions the intersection of the cross hairs near the edge of the active area of the platen he may inadvertently cause a portion of the actual pickup to extend beyond the active area, with a resultant drastic loss of coupling. To counter this, systems using such pickups must mark the limits of the usable digitizing surface as a more diminished region of the actual active area than would be necessary if the diameter of the pickup were smaller.

Each of these difficulties is either diminished or absent in an aperture pickup utilizing transparent conductors. An aperture pickup affords good coupling because it essentially presents a solid disc of substantial size. Rotational effects are absent because the effective pickup disc is easily made circular by use of a circular aperture. Assembly is simple, requiring only precise alignment of the aperture with respect to the cross hairs, and these can easily be on opposite sides of the same piece of glass. The aperture pickup is easily shielded by including in the reticle an additional piece of glass entirely covered on one side with a transparent conductor. Connections to the various conductive coatings are easily made by flexible metal fingers if the glass pieces possess different sizes or different shapes, so that each layer of transparent conductor is partially exposed when the glass pieces are laminated together. In addition, because an aperture pickup affords good coupling, the diameter of the aperture can be small—so that it is well within the viewing area of the reticle. This allows the usable region of the digitizing surface to be a larger portion of the actual active digitizing surface than is possible with pickup schemes whose actual region of coupling is exterior to the reticle.

SUMMARY OF THE INVENTION

This invention pertains to the design and use of capacitors. More particularly, the invention pertains to a way of defining the shape and extent of a region of capacitive coupling between two non-grounded plates of a capacitor by placing a grounded shield between the plates. An aperture in the shield defines the shape and limits the extent of the capacitive coupling between the two plates experienced by a signal referenced to the ground.

A specific application of the aperture technique involves the fabrication of a movable cursor for a digitizer. By using layers of glass coated with transparent conductive films of indium oxide ($In_2O_3$) a fully shielded aperture pickup is obtained.

BRIEF DESCRIPTION OF THE DRAWINGS

FIG. 1 is a perspective view of a cursor for a digitizer, utilizing a transparent capacitive aperture pickup.

FIG. 2A is a diagram illustrating the physical equivalent of the aperture pickup of FIG. 1.

FIG. 2B is a diagram of the equivalent electrical circiut of FIG. 2A.

FIG. 2C is a schematic representation of the aperture capacitor of FIG. 2A.

FIG. 5 is a more detailed drawing of the construction of the cursor, and illustrates the operation of the vacuum hold-down.

FIG. 6 is a drawing illustrating the details of the construction of the reticle in the cursor of FIG. 1; the reticle consists of laminated pieces of glass with conductive coatings to form the shield, aperture, and pickup disc.

FIG. 7A is a schematic illustrating the basic concept of an aperture capacitor.

FIG. 7B is a schematic illustration of the application of the aperture capacitor of FIG. 7A to a capacitive pickup for a travelling wave digitizer.

FIG. 7C is a schematic illustration of an aperture capacitor having two or more plates for sensing the signal coupled through the aperture.

FIG. 7D is a schematic illustration of an aperture capacitor having two or more plates on each side of the aperture.

FIG. 7E is a schematic illustration of the application of the principle of an aperture capacitor to obtain a variable capacitive coupling.

DESCRIPTION OF THE PREFERRED EMBODIMENT

Figure 3:
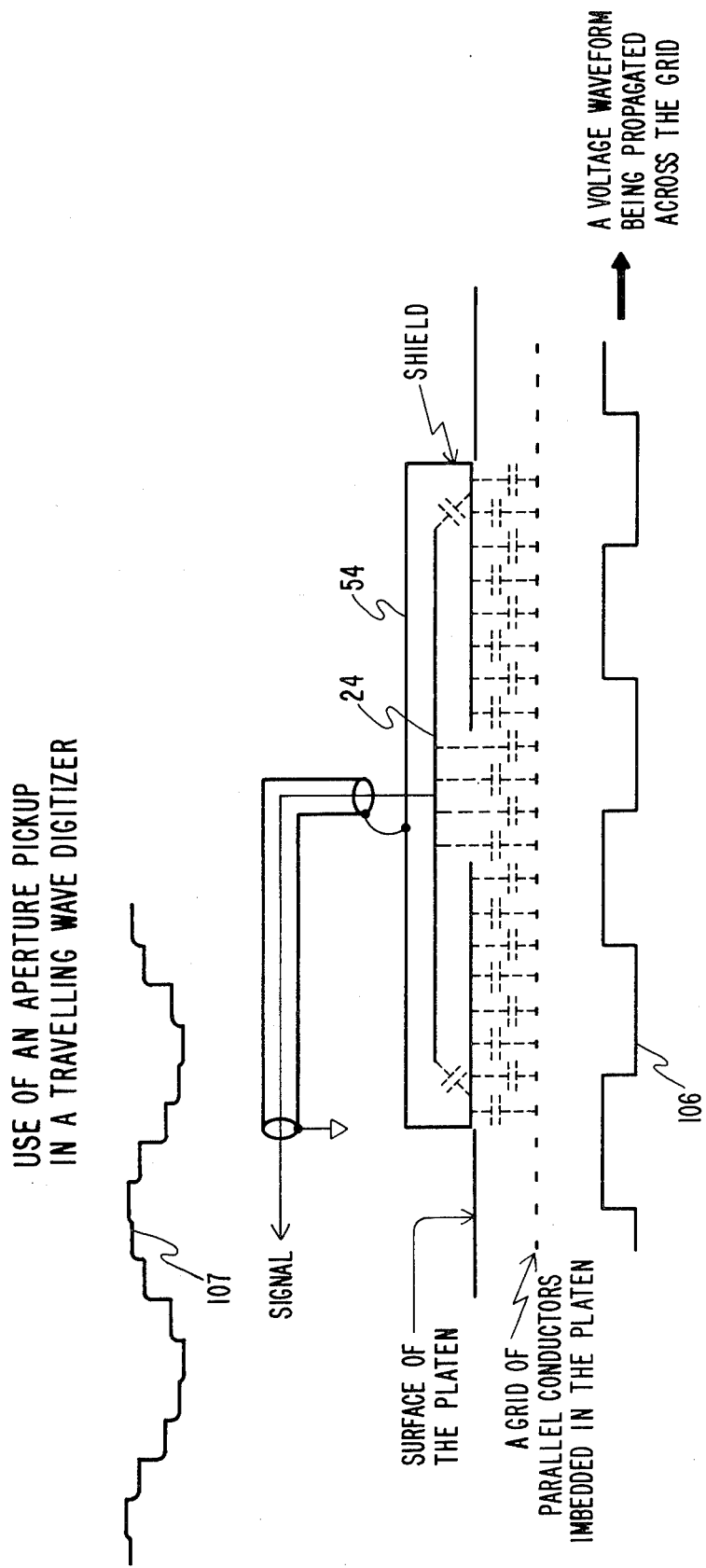
FIG. 3 is a diagram illustrating how an aperture pickup can be employed in a digitizer that utilizes a propagating voltage gradient.

Referring to FIG. 1, there is shown a perspective view of a capacitive aperture pickup 4 with transparent capacitive elements and aperture, and having a vacuum hold down. The illustrated pickup is intended for use with the digitizer disclosed in co-pending U.S. patent application Ser. No. 944,931, Carau et al., filed Sept. 22, 1978, assigned to the Hewlett-Packard Company, and titled "Travelling Wave Digitizer." In the present disclosure only a brief description is given of the overall digitizing process in which the pickup cooperates, and many of the specific properties of the pickup (which can also be properly called a cursor when used with a digitizer) may best be understood with reference to the above mentioned co-pending application. To facilitate referral to the above mentioned application, the reference numerals used in this application are consistent with those employed in "Travelling Wave Digitizer." The present disclosure is directed in general to the nature of an aperture capacitor, and to a transparent aperture pickup in particular; it is also directed to the vacuum hold down. Although the aperture pickup is herein explained and its application illustrated primarily in connection with its use with a digitizer, it will be abundantly clear that other applications of the principle of aperture controlled capacitive coupling are possible.

In FIG. 1 the pickup is shown against a portion of an arbitrary background 100 so that the transparent regions may be clearly distinguished.

As explained below, the electrical nature of the pickup is that of a conductive surface having capacitive coupling to grid elements in a digitizing surface. This coupling must occur through an aperture 23 in a grounded shield interposed between the otherwise capacitively coupled grid elements and the conductive surface. The electrical conductors necessary to connect the conductive surface, the shield, as well as other switches and lights on the movable cursor 4, to the digitizer proper, are routed through a flexible hollow tube 101 terminating in a connector 102. The connector possesses a vacuum channel connected to the hollow interior of the tube. A controllable vacuum source in the digitizer can be made to generate, upon command, a (partial) vacuum which is then felt in the hollow tube. (The partial vacuum is a pressure of approximately 100 mm Hg.) Means are provided to route this vacuum to the underside of the cursor, so that the cursor is rendered immobile when the vacuum is present (if the cursor is on the digitizing surface, or platen, of the digitizer).

Referring now to FIG. 2A, the physical nature of the aperture pickup is shown to be that of a conductive pickup disc 24, larger in size than the aperture 23. The output signal is taken by an electrical connection to the pickup disc 24, while the shield 54 is connected to an appropriate circuit ground, or to a potential possessing an ac ground.

The principle involved here is that the amount of capacitive coupling between the conductor 103 and the pickup disc 24 experienced by the signal of generator 126 is approximately directly proportional to the area of the aperture 23. That is, if the pickup is positioned so that the pickup disc 24 is parallel to the conductor 103 the effective coupling is primarily limited to that existing between the projection 104 of the aperture onto the conductor 103, and a similar projection 105 onto the pickup disc 24. There will, of course, be capacitive coupling between the entire pickup disc 24 and the shield 54. The capacitances form a capacitive divider, as shown in FIG. 2B. The effects of this divider may need to be taken into account by the circuitry employing the aperture pickup.

The coupling capacitance between the conductor 103 and the pickup disc 24 is only approximately directly proportional to the area of the aperture because the lines of force of the electric field producing the coupling do not proceed only along lines parallel to the projections mentioned above. A small amount of coupling occurs outside the strict projection because of fringe effects.

FIG. 2C is a schematic representation of the aperture capacitor circuit whose physical configuration is shown in FIG. 2A.

Referring now to FIG. 3, shown therein is one use of an aperture capacitor in connection with a digitizer utilizing a propagating voltage gradient, (i.e. a "travelling wave"). The position of the pickup is determined by noticing the time required for a voltage gradient in a waveform 106 to propagate from the edge of the digitizing surface to the vicinity of the aperture. The gradient is impressed across a grid of parallel conductors imbedded in the platen beneath the cursor. A document to be digitized (not shown) is placed on the surface of the platen, and the cursor positioned over the point to be digitized. As the travelling gradient departs the edge of the active digitizing surface a timer is started. The signal 107 coupled into the pickup through the aperture is used to shut the timer off when the gradient reaches the vicinity of the aperture. The timer will then contain a value related to the distance of the cursor from the edge of the digitizing surface. That number can be manipulated to become part of the Cartesian coordinate of the point being digitized.

The function of the aperture pickup in the digitizing technique outlined above is to sense the arrival of a voltage gradient travelling laterally across a succession of parallel conductors in a grid. In such an application the effects of the capacitive divider shown in FIG. 2B are not a major concern, save that the amplitude of the signal coupled into the pickup is not so severely attenuated that it is rendered indiscernible. The significance resides in the timing of the signal, not in its amplitude.

In such an application of an aperture pickup, however, it is an advantage that the shape of the aperture is circular. That allows the operator to twist the cursor about its cross hairs without changing the measured coordinate, and generally to ignore the cursor's rotational orientation with respect to the digitizing surface. This is a direct consequence of the symmetry of a circle about its center; the center of the circular aperture is made to coincide with the intersection of the cross hairs. Thus, the amount and location of the capacitive coupling of the pickup disc 24 to the grid in the platen is invariant with respect to rotation of the cursor.

Other aperture shapes besides circular could conceivably be employed in a cursor such as the one described. Such shapes should possess symmetry about (i.e., equal area on either side of) a pair of perpendicular lines whose intersection is in the center of the shape. This is necessary to ensure that the effective center of the aperture does not shift as the cursor is rotated about its center. The superior advantage of a circular aperture is that it is the only shape wherein the effective center does not shift as the cursor is rotated, even if the electrical axes imbedded within the platen are *not* perpendicular.

In other applications, it may be desirable to sense the degree of relative rotation between the capacitively coupled elements. In such a circumstance an aperture in the form of a slit, or some other shape, could be used to provide a variable capacitance whose value is related to the ensuing degree of overlap between the projection of the aperture onto the pickup disc and the particular shape of the conductor or conductors being coupled through the aperture to the pickup disc.

Figure 4:
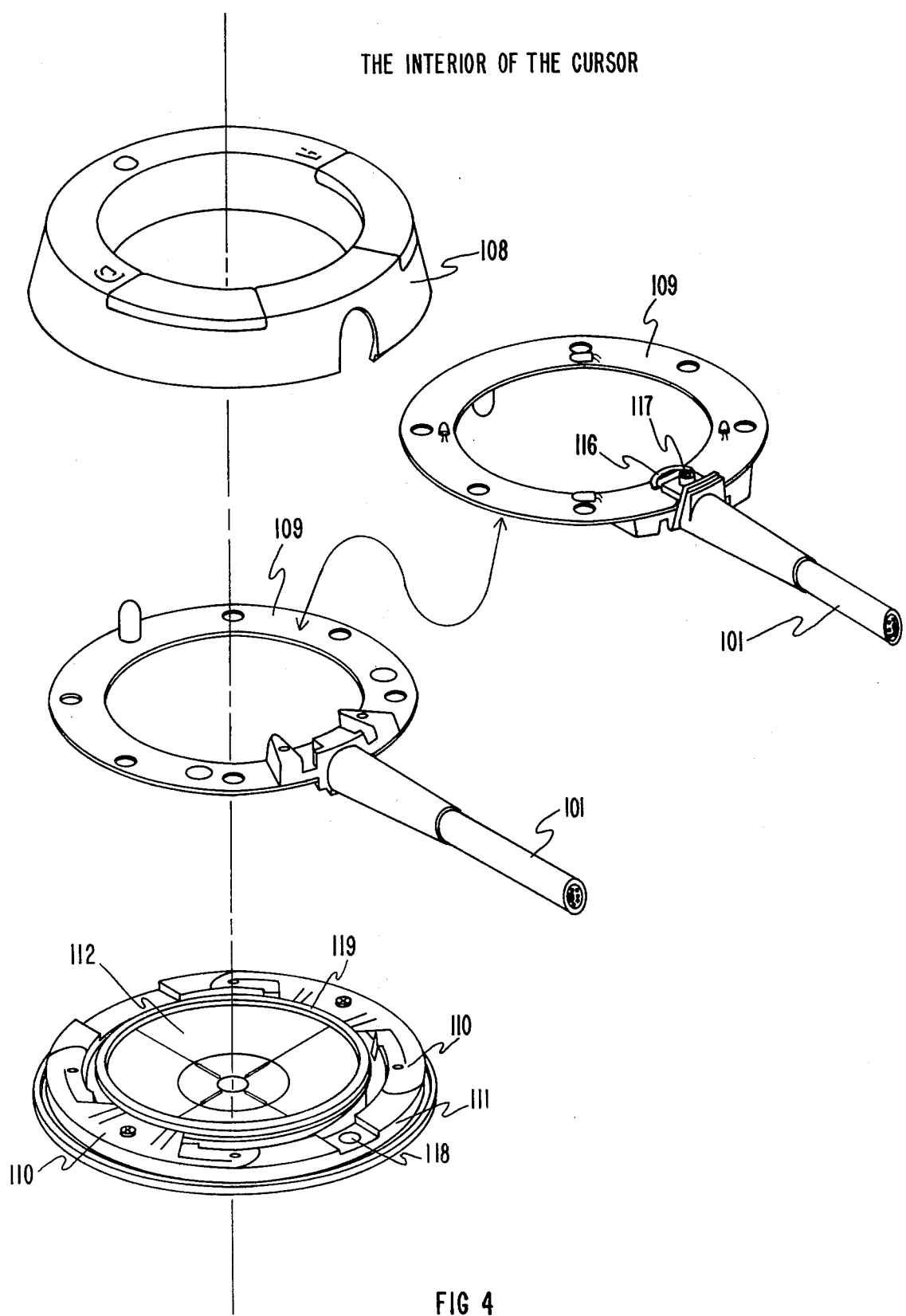
FIG. 4 is a drawing illustrating the general construction details of the cursor of FIG. 1.

The general nature of the cursor's construction may be understood with reference to FIG. 4. The pickup elements of the cursor are contained between a housing 108 and a base 111. A printed circuit board 109, and flexible metal fingers 110 and 116, serve to connect the conductors in the hollow tube 101 to the transparent conductive coatings of the laminated glass reticle assembly 112. A flexible gasket 119 provides a seal between the glass reticle assembly 112 and the housing 108 to exclude dirt and other contaminants from the interior of the cursor.

The vacuum channel within the hollow tube 101 is extended into the base 111 by a molded opening 117 in the cursor end of the hollow tube. The opening 117 has a ridge that fits snugly into a hole 118 in the base. The hole 118 opens into a circular channel in the underside of the base.

A more detailed understanding of the construction of the cursor may be had with reference to FIG. 5.

As shown there, the reticle assemlby 112 consists of three pieces of glass, 113, 114, and 115. These pieces are coated with transparent conductive coatings of indium oxide ($In_2O_2$) as explained in the next section.

The three pieces are subsequently aligned and laminated together with optical cement. The resulting assembly fits snugly into the base 111. The reticle assembly is held in the base by a continuous bond of glue along the region of mutual contact. Besides retaining the reticle assembly, the glue acts as a seal to prevent vacuum leaks. As is shown in connection with FIG. 6, the metal fingers 110 connect together the conductive layers on glass pieces 113 and 115. This is achieved through the action of tabs 121 and 120 (of which there are four each). The screws that fasten the fingers 110 to the base 111 also serve to electrically connect each of the coatings on glass pieces 113 and 115 to the base 111. Base 111 is connected via P.C. board 109 to a conductor in the tube 101 to an ac ground. Collectively, elements 113, 115, and 111 form the shield 54 of FIG. 2.

Glass piece 115 has a beveled edge, as shown in the inset. This serves two purposes. First, the bevel is silvered to reflect light from incandescent lamps (not shown) on P.C. board 109 onto the cross hairs, which are on the underside of the glass. Second, and of importance to the vacuum flow, the beveled edge forms, in conjunction with the interior edge of the base 111, a circular groove on the underside of the cursor. The groove opens into the cavity produced by the hole 118, so that the vacuum may reach the groove. The underside of the reticle assembly 112 (i.e., the underside of glass piece 115) does not extend to the full depth of the base 111. Thus, a slight void remains between the surface being digitized and the underside of 115. This void is contiguous with the circular groove, and distributes the vacuum uniformly across the bottom of the cursor for a more effective hold-down action. It also prevents abrasion of the reticle, or cross hairs.

Referring now to FIG. 6, therein is shown the manner in which the reticle assembly is made and how electrical connections are made to it. First, observe the three pieces of glass, 113, 114, and 115. These are each of a different size and shape. The top piece 113 has a transparent coating of indium oxide over its entire upper surface. This coating will form a portion of a shield around the pickup disc. The next piece of glass 114 has eight sides, and has a major diameter larger than piece 113. Piece 114 is also coated with indium oxide on its entire upper surface, and forms the pickup disc 24 of FIG. 2.

The lower piece in the reticle assembly is piece 115. It has the beveled edge whose function has already been described. On its underside is etched the actual reticle, which in the present embodiment is a cross hairs. Its upper side also has a coating of indium oxide, except that the circular region of the aperture, centered over the cross hairs, is left uncoated.

Piece 114 is used as the pickup "disc," even though it is not strictly in the shape of a disc; because of the action of the aperture its particular shape is of little concern. The shape chosen has a desirable property, however, in that a portion 125 of piece 114 sticks out from beneath piece 113. Also, piece 114 does not fully obscure piece 115; a portion 124 of piece 115 is accessible. The coating 123 on the upper side of piece 113 is, of course, fully accessible.

When aligned and cemented together with optical cement, all three layers of the indium oxide coatings are accessible to the metal fingers which are to make contact with them. To retard corrosion induced by humidity, the regions of indium oxide in the vicinity of the intended contact with the metal fingers are given a light coat of conductive paint. In the present embodiment a paint high in silver content is used. As explained in connection with FIG. 5, the coatings on pieces 113 and 115 are connected and made common to the grounded base 111 through the action of tabs 120 and 121 on metal fingers 110. Contact is made with the pickup "disc" 114 at location 122 through the action of metal finger 116 (refer also to FIGS. 4 and 5).

One final word concerning the coatings of indium oxide. In order to be transparent, they must be thin; in the present embodiment they are on the order of 285 Å.

The coating is applied by standard deposition techniques. A similar coating of tin oxide could also be used.

The general scope of the invention is illustrated by the various portions of FIG. 7. FIG. 7A illustrates again, for clarity, the basic concept of an aperture capacitor. FIG. 7B illustrates how the basic concept is applied in connection with a capacitive pickup for a digitizer employing a propagating voltage gradient. Such an application involves the coupling through an aperture of signals originating from a multiplicity of plates. In that application the position of a moving aperture determines which plates among the multiplicity of driven plates are selected to couple a signal into the plate on the other side of the aperture.

FIGS. 7C and 7D illustrate other possible configurations of aperture capacitors having multiple plates.

The aperture in an aperture capacitor need not be fixed. Besides the use of a movable aperture already outlined in connection with FIGS. 3 and 7B, consider the variable cpacitance shown in FIG. 7E. There a movable aperture selects for coupling a region of each of two plates whose distance apart are not uniform. The result is variable capacitive coupling related to the position of the aperture.

In addition, the scope of the invention covers apertures of any shape, such as circular, triangular, square, rectangular, etc., or such as the shapes of the digits zero through nine, and the shapes of the Roman alphabet A through Z, etc. Likewise, a shield might have more than one aperture.

Figure 8:
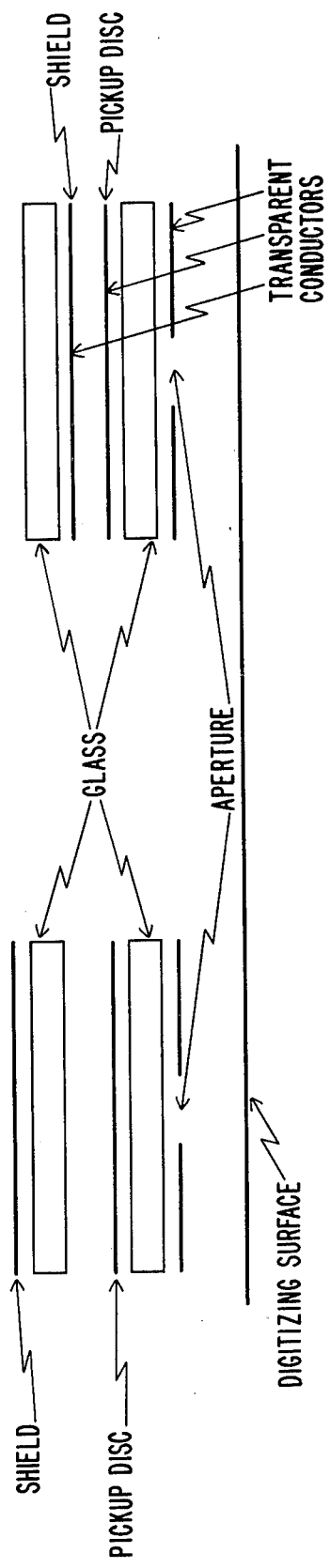
FIG. 8 is a diagram illustrating possible alternate physical arrangements of the aperture pickup of FIG 6.

As a further example of the scope of the invention, consider the alternate embodiments shown in FIG. 8. Both alternate ebodiments involve only two pieces of glass, instead of three as shown in FIG. 6. In each case the aperture is on the underside of the bottom piece of glass, while the pickup disc is on the upper side of the bottom piece of glass. The difference between the two alternate embodiments concerns the location of the shield on the upper piece of glass; it can be on either side, depending upon the specific mounting arrangement.

The embodiments shown in FIG. 8 could be used to advantage in situations where maximum coupling is required; the pickup disc is only one thickness of glass away from the digitizing surface instead of two, as in the embodiment of FIG. 6.

I claim:

1. Apparatus for optical alignment with and capacitive coupling to a conductor, the apparatus comprising:
    a transparent first conductive surface for capacitive coupling to the conductor at a location along the conductor that is in optical alignment with the transparent first conductive surface; and
    a second conductive surface, electrically isolated from the transparent first conductive surface, physically interposed between the conductor and the transparent first conductive surface, and having an aperture that first limits the capacitive coupling between the conductor and the transparent first conductive surface by shielding the transparent first conductive surface from the conductor except in the region of the aperture and that second provides a region at least through which the apparatus is optically alignable with the conductor.

2. Apparatus as in claim 1 wherein the transparent first conductive surface comprises:
    a transparent first conductive coating; and
    a transparent first substrate surface of insulating material for supporting the transparent first conductive coating.

3. Apparatus as in claim 2 in which the transparent first conductive coating comprises indium oxide.

4. Apparatus as in claim 2 in which the transparent first conductive coating comprises tin oxide.

5. Apparatus for optical alignment with and capacitive coupling to a conductor, the apparatus comprising:
    a transparent first conductive surface for capacitive coupling to the conductor at a location along the conductor that is in optical alignment with the transparent first conductive surface; and
    a transparent second conductive surface electrically isolated from the transparent first conductive surface, physically interposed between and in optical alignment with the conductor and the transparent first conductive surface, and having an aperture that limits the capacitive coupling between the conductor and the transparent first conductive surface by shielding the transparent first conductive surface from the conductor except in the region of the aperture.

6. Apparatus as in claim 5 wherein the transparent first and second conductive surfaces comprise transparent first and second conductive coatings respectively upon transparent first and second substrate surfaces of insulating material.

7. Apparatus as in claim 6 in which at least one of the transparent first and second conductive coatings comprises indium oxide.

8. Apparatus as in claim 6 in which at least one of the transparent first and second conductive coatings comprises tin oxide.

9. Apparatus for optical alignment with and capacitive coupling to a conductor, the apparatus comprising:
    a transparent outer conductive surface;
    a transparent first conductive surface for capacitive coupling to the conductor at a location along the conductor that is in optical alignment with the transparent first conductive surface, the transparent first conductive surface being electrically isolated from and shielded by the transparent outer conductive surface but physically interposed between and in optical alignment with the conductor and the transparent outer conductive surface; and
    a transparent second conductive surface, electrically isolated from the transparent first conductive surface but electrically connected to the transparent outer conductive surface, physically interposed between and in optical alignment with the conductor and the transparent first conductive surface, and having an aperture that limits the capacitive coupling between the conductor and the transparent first conductive surface by shielding the transparent first conductive surface from the conductor except in the region of the aperture.

10. Apparatus as in claim 9 in which the transparent first, second and outer condutive surfaces comprise transparent first, second and outer conductive coatings respectively upon transparent first, second and outer substrate surfaces of insulating material.

11. Apparatus as in claim 10 in which at least one of the transparent first, second and outer conductive coatings comprises indium oxide.

12. Apparatus as in claim 10 in which at least one of the transparent first, second and outer conductive coatings comprises tin oxide.

13. Capacitive coupling apparatus as in claim 1, 5 or 9 further comprising a reticle in optical alignment with the aperture.

14. A method of capacitively coupling to a conductive workpiece, comprising the steps of:
positioning a transparent conductor proximate to the conductive workpiece at a location optically observed through the transparent conductor; and
electrostatically shielding the transparent conductor from the conductive workpiece except in a region about the observed location.

15. A method of capacitively coupling a signal between a conductor in a digitizing platen and a digitizing cursor having a reticle, comprising the steps of:
optically aligning the reticle with the location whose coordinates are to be digitized;
capacitively coupling the signal between the conductor in the platen and a transparent conductive surface in the cursor in optical alignment with the reticle; and
electrostatically shielding the transparent conductive surface with at least one other transparent conductive surface except in a region adjacent the platen and centered about the reticle.

16. An aperture capacitor pickup, for a digitizer having a position signal that is referenced to a signal ground and that emanates from a work surface upon which the aperture capacitor pickup is positionable, the aperture capacitor pickup comprising:
a base, for receiving transparent substrates of insulating material so that the transparent substrates move as a unit over the work surface as the aperture capacitor pickup is positioned on the work surface;
a first transparent substrate of insulating material, seated in the base so that it is proximate to and generally parallel to the work surface when the base is resting on the work surface, the first transparent substrate having top and bottom surfaces, the bottom surface being the one that is generally closest to the work surface, and the top surface being the one that is generally furthest from the work surface, the first transparent substrate providing a surface for coating with a transparent conductor;
a second transparent substrate of insulating material, seated in the base such that the first transparent substrate interposes between the second transparent substrate and the work surface, the second transparent substrate having top and bottom surfaces, the bottom surface being the one that is generally closest to the top surface of the first transparent substrate, and the top surface being the one that is generally furthest from the top surface of the first transparent substrate, the second transparent substrate also having a shape such that it generally covers the entire first transparent substrate, save that at least one exposed portion of the top surface of the first transparent substrate remains, the second transparent substrate providing a surface for coating with a transparent conductor;
a third transparent substrate of insulating material, seated in the base such that the second transparent substrate interposes between the third transparent substrate and the first transparent substrate, the third transparent substrate having top and bottom surfaces, the bottom surface being the one that is generally closest to the top surface of the second transparent substrate, and the top surface being the one that is generally furthest from the top surface of the second transparent substrate, the third transparent substrate also having a shape such that it generally covers the entire second transparent substrate, save that at least one exposed portion of the second transparent substrate remains, and the shape of the third transparent substrate also being such that it leaves unobscured the exposed portion of the top surface of the first transparent substrate, the third transparent substrate providing a surface for coating with a transparent conductor;
a first transparent conductive coating, upon the top surface of the first transparent substrate, such that the coating is present on the exposed portion of the first transparent substrate, the first transparent conductive coating providing, when it is grounded to the signal ground, a shielded region in which capacitive coupling to the position signal is not possible, the first transparent conductive coating also having an aperture, for defining within the shielded region a limited active region in which capacitive coupling to the position signal is possible;
first contact means, for connecting the first transparent conductive coating to the signal ground, the connection to the first transparent conductive coating being made by a contact touching the first transparent conductive coating present on the exposed portion of the first transparent substrate;
a second transparent conductive coating, upon the top surface of the second transparent substrate, the shape of the second transparent conductive coating being such its perimeter is everywhere within the shielded region and being such that it contains the entire periphery of the intersection of the active region with the top surface of the second transparent substrate, and the shape of the second transparent conductive coating also being such that it is present on the exposed region of the top surface of the second transparent substrate, the second transparent conductive coating providing a conductive surface into which the position signal is coupled within the active region defined by the aperture in the first transparent conductive coating;
second contact means, for connecting the second transparent conductive coating to the digitizer, the connection to the second transparent conductive coating being made by a contact touching the second transparent conductive coating present on the exposed portion of the second transparent substrate;
a third transparent conductive coating, upon the top surface of the third transparent substrate, the shape of the third transparent conductive coating being such that it generally covers the second transparent conductive coating, for providing, when the third transparent conductive coating is connected to the signal ground, shielding for the second transparent conductive coating from signals not coupled through the aperture in the first transparent conductive coating; and
third contact means, for connecting the third transparent conductive coating to the signal ground.

17. An aperture capacitor pickup as recited in claim 16, wherein at least one of the first, second, and third transparent conductive coatings comprises indium oxide.

18. An aperture capacitor pickup as recited in claim 16, wherein at least one of the first, second, and third transparent conductive coatings comprises tin oxide.

19. An aperture capacitor pickup as recited in claim 16, wherein at least one of the first, second, and third transparent substrates of insulating material comprises glass.

20. An aperture capacitor pickup as recited in claim 16, wherein:
the base is metallic and conductive;
the base is electrically connected to the signal ground, for providing additional shielding for the second transparent conductive coating and for providing a ground for the first and third contact means; and wherein
the first and third contact means comprise at least one flexible and resilient strip of metal physically fastened to and electrically connected to the base, each flexible and resilient strip of metal having one or more protruding tabs for making electrical contact with the first transparent conductive coating exposed in the exposed portion of the first transparent substrate and with the third transparent conductive coating.

21. An aperture capacitor pickup for capacitively sensing a signal that is referenced to a signal ground and that emanates from a work surface, the aperture capacitor pickup comprising:
a first transparent substrate of insulating material, physically proximate to and generally parallel to the work surface, and having top and bottom surfaces, the bottom surface being the one that is generally closest to the work surface and the top surface being the one that is generally furthest from the work surface, the first transparent substrate providing surfaces for receiving transparent conductive coatings;
a first transparent conductive coating, on the bottom surface of the first transparent substrate and electrically connected to the signal ground, for providing a shielded region within which capacitive coupling to the signal is not possible, the first transparent conductive coating also having an aperture for defining within the shielded region a limited active region in which capacitive coupling to the signal is possible;
a second transparent conductive coating, on the top surface of the first transparent substrate and electrically isolated from the first transparent conductive coating, the shape of the second transparent conductive coating being such that perimeter of the second transparent conductive coating is everywhere within the shielded region, and also being such that periphery of the intersection of the active region with the top surface of the first transparent substrate is entirely within the perimeter of the second transparent conductive coating, the second transparent conductive coating providing a conductive surface into which the signal is capacitively coupled within the region defined by the aperture;
a second transparent substrate of insulating material, physically proximate to the top surface of the first transparent substrate, such that the top surface of the first transparent substrate interposes between the second transparent substrate and the bottom surface of the first transparent substrate, the second transparent substrate having top and bottom surfaces, the bottom surface being the one that is generally closest to the top surface of the first transparent substrate, and the top surface being the one that is generally furthest from the first transparent substrate, the second transparent substrate providing a surface for receiving a transparent conductive coating; and
a third transparent conductive coating, on a surface of the second transparent substrate and electrically connected to the signal ground, the third transparent conductive coating being of a size and shape that generally covers the second transparent conductive coating, the third transparent conductive coating providing a shield that prevents signals not coupled through the aperture from coupling into the second transparent conductive coating.

22. An aperture capacitor pickup as recited in claim 21 wherein the third transparent conductive coating is on the top surface of the second transparent substrate.

23. An aperture capacitor pickup as recited in claim 21 wherein the third transparent conductive coating is on the bottom surface of the second transparent substrate.

* * * * *

UNITED STATES PATENT AND TRADEMARK OFFICE
CERTIFICATE OF CORRECTION

PATENT NO. : 4,194,084

DATED : March 18, 1980

INVENTOR(S) : Henry T. Hetzel

It is certified that error appears in the above–identified patent and that said Letters Patent are hereby corrected as shown below:

Column 1, line 8, after "Frank" insert --Paul--;

Column 1, line 19, "sveral" should be --several--;

Column 5, line 57, there should not be an indentation;

Column 8, line 59, "condutive" should be --conductive--;

Signed and Sealed this

Twenty-fourth Day of June 1980

[SEAL]

Attest:

SIDNEY A. DIAMOND

Attesting Officer     Commissioner of Patents and Trademarks